United States Patent
Takenaka et al.

(10) Patent No.: US 8,469,424 B2
(45) Date of Patent: Jun. 25, 2013

(54) FLUID PRESSURE TRANSMISSION DEVICE AND ROBOT HAND DEVICE

(75) Inventors: Toru Takenaka, Saitama (JP); Hironori Waita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/496,119

(22) PCT Filed: Sep. 3, 2010

(86) PCT No.: PCT/JP2010/065104
§ 371 (c)(1),
(2), (4) Date: Mar. 14, 2012

(87) PCT Pub. No.: WO2011/033946
PCT Pub. Date: Mar. 24, 2011

(65) Prior Publication Data
US 2012/0169081 A1    Jul. 5, 2012

(30) Foreign Application Priority Data
Sep. 15, 2009   (JP) .................................. 2009-213061

(51) Int. Cl.
*B25J 15/08* (2006.01)
(52) U.S. Cl.
USPC .............................. 294/198; 294/192; 901/37
(58) Field of Classification Search
USPC ............ 294/192, 198, 106, 213, 907; 901/37, 901/46
See application file for complete search history.

(56) References Cited

U.S. PATENT DOCUMENTS

| | | | | |
|---|---|---|---|---|
| 3,694,021 A | * | 9/1972 | Mullen | 294/106 |
| 4,350,381 A | * | 9/1982 | Hellmann | 294/208 |
| 4,667,475 A | * | 5/1987 | Wesman | 60/537 |
| 4,733,895 A | * | 3/1988 | Hawkes | 294/198 |
| 4,834,761 A | * | 5/1989 | Walters | 623/26 |
| 7,221,120 B2 | * | 5/2007 | Tadano | 318/567 |
| 8,182,010 B2 | * | 5/2012 | Lee et al. | 294/198 |

FOREIGN PATENT DOCUMENTS

| | | |
|---|---|---|
| JP | 06-058086 A | 3/1994 |
| JP | 06-058087 A | 3/1994 |
| JP | 08-126984 A | 5/1996 |

OTHER PUBLICATIONS

International Search Report corresponding to International Application No. PCT/JP2010/065104 dated Sep. 28, 2010.

* cited by examiner

*Primary Examiner* — Dean Kramer
(74) *Attorney, Agent, or Firm* — Squire Sanders (US) LLP

(57) ABSTRACT

A fluid pressure transmission device is equipped with a plurality of driving fluid pressure cylinders $37_1$, $37_2$, a plurality of driven fluid pressure cylinders 23, 24 with cylinder chambers 23a, 24a thereof being communicated with cylinder chambers $371_1$, $371_2$ of the main driving fluid pressure cylinders $37_1$, $37_2$ via fluid pressure transmission pipes $38_1$, $38_2$, and a sub driving fluid pressure cylinder 41 which is divided into two cylinder chambers 41a, 41b by a piston 412, and the fluid pressure generated by the main driving fluid pressure cylinders $37_1$, $37_2$ is transmitted to the driven fluid pressure cylinders 23, 24. Pistons $371_1$, $371_2$ are driven by the main motor 40, and the piston 412 is driven by the assistant motor 43. The fluid pressure transmission pipes $38_1$, $38_2$ and the cylinder chambers 41a, 41b of the sub driving fluid pressure cylinder are connected via connecting pipes $42_1$, $42_2$.

5 Claims, 6 Drawing Sheets

FLUID PRESSURE TRANSMISSION DEVICE AND ROBOT HAND DEVICE

TECHNICAL FIELD

The present invention relates to a fluid pressure transmission device equipped with a driving fluid pressure cylinder and a driven fluid pressure cylinder, and a robot hand device equipped with the fluid pressure transmission device.

BACKGROUND ART

Conventionally, there is known a robot hand device equipped with a plurality of finger mechanism mimicking a human hand, and a hand body connected with the finger mechanisms (for example, refer to Patent Document 1). The finger mechanisms of the robot hand device of Patent Document 1 are bent and stretched by a fluid pressure transmission device. The fluid pressure transmission device is equipped with a plurality of driven fluid pressure cylinders provided inside the hand body, and a plurality of driving fluid pressure cylinders provided outside the hand body and respectively connected to the driven fluid pressure cylinders via fluid pressure transmission pipes.

When fluid pressure is generated by the driving fluid pressure cylinder with a driving source such as a motor, the fluid pressure is applied to the driven fluid pressure cylinder connected to the driving fluid pressure cylinder. Thereafter, a piston of the driven fluid pressure cylinder advances and retreats, and a movable member as a constituent element of the finger mechanism connected to the piston moves. As such, with the advancing and retreating of the piston of the driven fluid pressure cylinder, the bending and stretching operation of the joints of the finger mechanism is performed.

PRIOR ART REFERENCES

Patent Documents
Patent document 1: Japanese Patent Laid-Open No. H8-126984

SUMMARY OF THE INVENTION

Problems to be Solved by the Invention

In the conventional fluid pressure transmission device configured from the driving fluid pressure cylinders, the driven fluid pressure cylinders, and the fluid pressure transmission pipes, one corresponding driving fluid pressure cylinder is connected to the driven fluid pressure cylinder which is used for joints and the like required to perform precise operations.

In the device provided with a plurality of the driven fluid pressure cylinders, it is necessary to use driving source having large rated output, which is capable of responding to the maximum pressure and maximum speed required by the driven fluid pressure cylinders. Therefore, in proportion to the increase in the number of driven fluid pressure cylinders used for joints and the like required to perform precise operations, the overall fluid pressure transmission device becomes larger in size, and it is not possible to reduce its weight.

The present invention aims at providing a fluid pressure transmission device capable of reducing size and weight, and a robot hand device equipped with the fluid pressure transmission device.

Means for Solving the Problems

In order to solve the above-mentioned problems, the fluid pressure transmission device of the present invention is a fluid pressure transmission device equipped with a plurality of main driving fluid pressure cylinders, and a plurality of driven fluid pressure cylinders with cylinder chambers thereof being connected to cylinder chambers of the main driving fluid pressure cylinders via fluid pressure transmission paths, in which fluid pressure generated by the main driving fluid pressure cylinder is transmitted to the driven fluid pressure cylinder, the fluid pressure transmission device comprising: a main driving source which drives pistons of a plurality of the main driving fluid pressure cylinders; a sub driving fluid pressure cylinder which is divided into two cylinder chambers by a piston; a sub driving source which drives the piston of the sub driving fluid pressure cylinder; and a connection path which communicates the fluid pressure transmission paths with each cylinder chamber of the sub driving fluid pressure cylinder.

According to the fluid pressure transmission device of the present invention, it becomes possible to transmit the fluid pressure to cylinder chambers of a plurality of the driven fluid pressure cylinders, by advancing/retreating of the pistons of a plurality of the main driving fluid pressure cylinders with one main driving source (main actuator), and by advancing/retreating of the piston of the sub driving fluid pressure cylinder by the sub driving source (sub actuator).

Generally, it is rarely the case where the fluid pressure required by a plurality of the driven fluid pressure cylinders largely differs. Therefore, an intermediary fluid pressure required by a plurality of the driven fluid pressure cylinders is generated by advancing/retreating of the pistons of a plurality of the main driving fluid pressure cylinders by one main driving source. And the fluid pressure for adjusting the difference of the fluid pressure required by a plurality of the driven fluid pressure cylinders is generated by advancing/retreating of the piston of the sub driving fluid pressure cylinder by the sub driving source.

By doing so, it becomes possible to reduce the total cubic volume and weight of the driving sources, compared to the case where the pistons of the main driving fluid pressure cylinders are driven by separate driving sources such as in the above-mentioned conventional fluid pressure transmission device, so that it becomes possible to reduce the size and weight of the overall fluid pressure transmission device.

In the present invention, it is preferable that the main driving source has larger rated output than the sub driving source.

In the case where the main driving source, for example having twice the rated output of the conventional driving sources, that correspond to the total rated output of the driving sources for independently driving the pistons of a plurality of the main driving fluid pressure cylinder as in the above-mentioned conventional fluid pressure transmission device, is used, the cubic volume and the weight of the main driving source generally only increase by approximately 30 percent compared to the total of the conventional driving sources. Therefore, it becomes possible to further reduce the size and weight of the overall fluid pressure transmission device.

The fluid pressure transmission device of the present invention may be used in, for example, a robot hand device equipped with a finger mechanism capable of bending and stretching by a plurality of joints. In this case, the piston of the driven fluid pressure cylinder and movable member of the joint of the finger mechanism may be connected so that the joint of the finger mechanism bend and stretch accompanying advancing and retreating of the piston of the driven fluid pressure cylinder.

In the finger mechanism of the robot hand device mimicking human hand, the operations of the joints are not independent and are associated. For example, the PIP joint (the proximal interphalangeal joint) and the MP1 joint are rarely operated in the opposite direction, and in the case of operation with high load such as grasping and gripping, force is generated in the same direction. This can be understood from the fact that muscles crossing a plurality of joints exist in human fingers.

Therefore, it is preferable to use the fluid pressure transmission device of the present invention, which is suitable for the case where the fluid pressure necessary for a plurality of the driven fluid pressure cylinders does not largely differs, to the finger joints of the robot hand device. In the case where three or more joints exist as the finger joint, one driven fluid pressure cylinder may be provided to a plurality of the joints, and the joints may be operated with a constant relationship.

Further, it is preferable that the robot hand device is equipped with a plurality of the finger mechanisms, and at least two or more joints of a plurality of the finger joints bend and stretch accompanying advancing and retreating of the piston of the driven fluid pressure cylinder.

In the case where the robot hand device is equipped with a plurality of finger mechanisms, the fluid pressure transmission device of the present invention may be applied to arbitral finger mechanism. Specifically, the fluid pressure transmission device of the present invention is preferably applied to the finger mechanisms considered as force fingers which perform force operations including a gripping operation in accordance with the operations of the dexterous fingers which perform dexterous operations including an operation of pinching an object with the fingertips.

MODE FOR CARRYING OUT THE INVENTION

Figure 1:
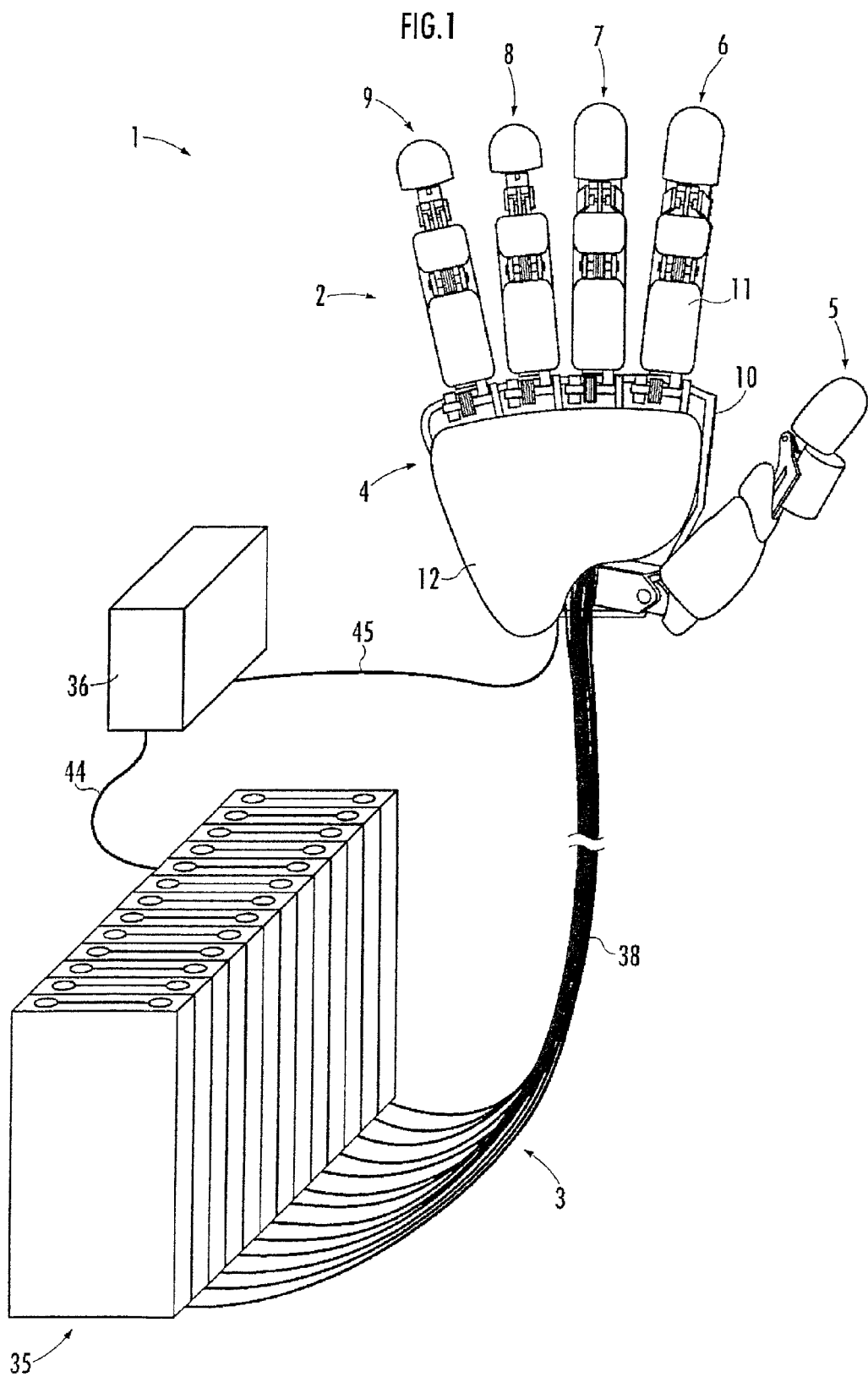
FIG. 1 is a schematic configuration diagram illustrating a robot hand device according to an embodiment of the present invention.

An embodiment of the present invention will now be described with reference to the drawings. Referring to FIG. 1, a hand device 1 according to the present embodiment is made up of a hand body 2 which mimics a human hand and a drive unit 3 which drives the hand body 2. The hand device is suitably applicable to a so-called humanoid robot.

The hand body 2 includes a base 4, and five finger mechanisms corresponding respectively to the five fingers, i.e. a thumb mechanism 5, an index finger mechanism 6, a middle finger mechanism 7, a ring finger mechanism 8, and a little finger mechanism 9, each having bending and stretching functions. The base 4 has a frame 10 which joins and supports the finger mechanisms. The front side and the back side of the base 4 correspond to the back and the palm of the hand, respectively. FIG. 1 shows the palm side of the hand body 2.

Each finger mechanism is covered with a finger skin element 11, with the joints being exposed, and the base 4 is covered with a base skin element 12.

Figure 2:
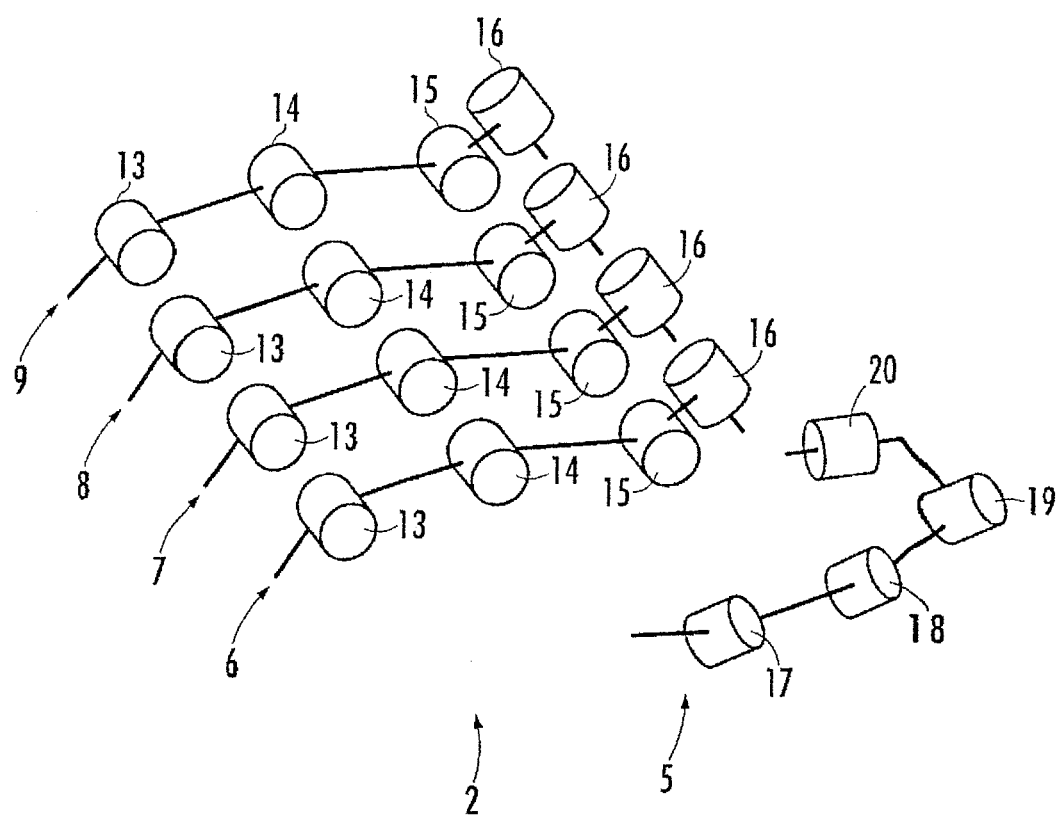
FIG. 2 schematically illustrates each joint of a hand body.

As schematically illustrated in FIG. 2, each finger mechanism is provided with a plurality of phalanxes and a plurality of joints. The index finger mechanism 6, the middle finger mechanism 7, the ring finger mechanism 8, and the little finger mechanism 9 each include, in order from the fingertip side, a DIP joint (the distal interphalangeal joint) 13, a PIP joint (the proximal interphalangeal joint) 14, an MP1 joint 15, and an MP2 joint 16, to be rotatable at the respective joints.

The DIP joint 13 rotates in one axis, and the PIP joint 14 rotates in one axis about an axis line which is parallel to the DIP joint 13. The MP1 joint 15 and the MP2 joint 16 constitute the metacarpophalangeal joint which rotates in two axes. The MP1 joint 15 rotates about an axis line which is parallel to the PIP joint 14, while the MP2 joint 16 rotates about an axis line which crosses the MP1 joint 15.

The DIP joint 13, the PIP joint 14, and the MP1 joint 15 are each configured to rotate in a direction toward the palm side of the base 4, so as to be able to perform a gripping operation and other bending and stretching motions. The MP2 joint 16 is configured to swing the corresponding finger mechanism in a direction toward or away from the neighboring finger mechanism, so as to enable an operation of spreading the hand, for example.

The thumb mechanism 5, as schematically illustrated in FIG. 2, includes, in order from the fingertip side, an IP joint (the thumb interphalangeal joint) 17, an MP joint (the thumb metacarpophalangeal joint) 18, a CM1 joint 19, and a CM2 joint 20, to be rotatable at the respective joints.

The IP joint 17 rotates in one axis, and the MP joint 18 rotates in one axis about an axis line which is parallel to the IP joint 17. The CM1 joint 19 and the CM2 joint 20 constitute the carpometacarpal joint which rotates in two axes. The CM1 joint 19 rotates about an axis line which is parallel to the MP joint 18, while the CM2 joint 20 rotates about an axis line which crosses the CM1 joint 19.

The IP joint 17, the MP joint 18, and the CM1 joint 19 are each configured to rotate in a direction toward the palm side of the base 4, or in a direction toward the finger pad side of any of the other four finger mechanisms 6, 7, 8, and 9, so as to be able to perform the gripping operation and other bending and stretching motions. The CM2 joint 20 is configured to rotate the thumb mechanism 5 so as to oppose the palm side or the finger pad side of any of the other four finger mechanisms 6, 7, 8, and 9.

Of the five finger mechanisms, three finger mechanisms of the thumb mechanism 5, the index finger mechanism 6, and the middle finger mechanism 7 are considered as dexterous fingers which perform dexterous operations including an operation of pinching an object with the fingertips, as will be described later, while the ring finger mechanism 8 and the little finger mechanism 9 are considered as force fingers which perform force operations including a gripping operation in accordance with the operations of the dexterous fingers.

The present inventors analyzed the motions of the human hands and fingers, and have found that the thumb, the index finger, and the middle finger are used for doing relatively delicate work, whereas the ring finger and the little finger are used for gripping and holding an object with relatively strong force, or for temporarily holding an object when switching the same from one hand to the other.

A human's operation of picking up a cylindrical object placed on a desk or the like will now be described by way of example. Firstly, the person touches the object with the thumb, the index finger, and the middle finger to confirm the posture of the object and, at the same time, corrects its posture so as to be able to easily grip the same by adjusting the amounts of forces applied by the thumb, the index finger, and the middle finger. Then, the person pinches the object with the fingertips of the thumb, the index finger, and the middle finger, to pick up the object (pinching operation). At this time, the ring finger and the little finger start to grip the object, causing transition from grasping with the thumb, the index finger, and the middle finger to grasping with the ring finger and the little finger.

Thereafter, the ring finger and the little finger firmly grip the object with relatively strong force (gripping operation), with the thumb, the index finger, and the middle finger additionally gripping the object, to thereby complete the operation of picking up the object. The pickup operation as described above is performed successively and quickly in a seamless manner.

Figure 3:
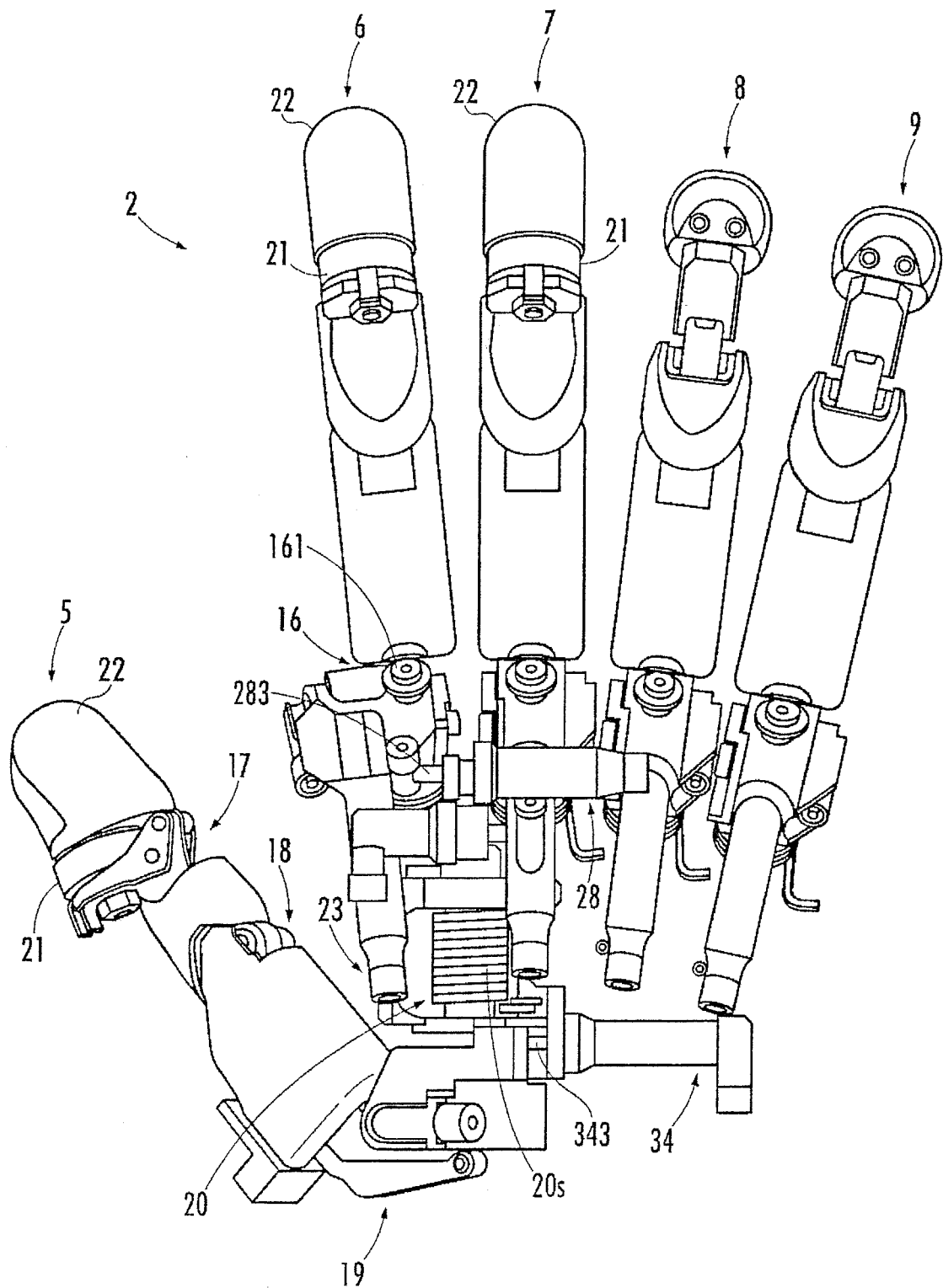
FIG. 3 illustrates the internal structure of the hand body as seen from the back of the hand.
Figure 4:
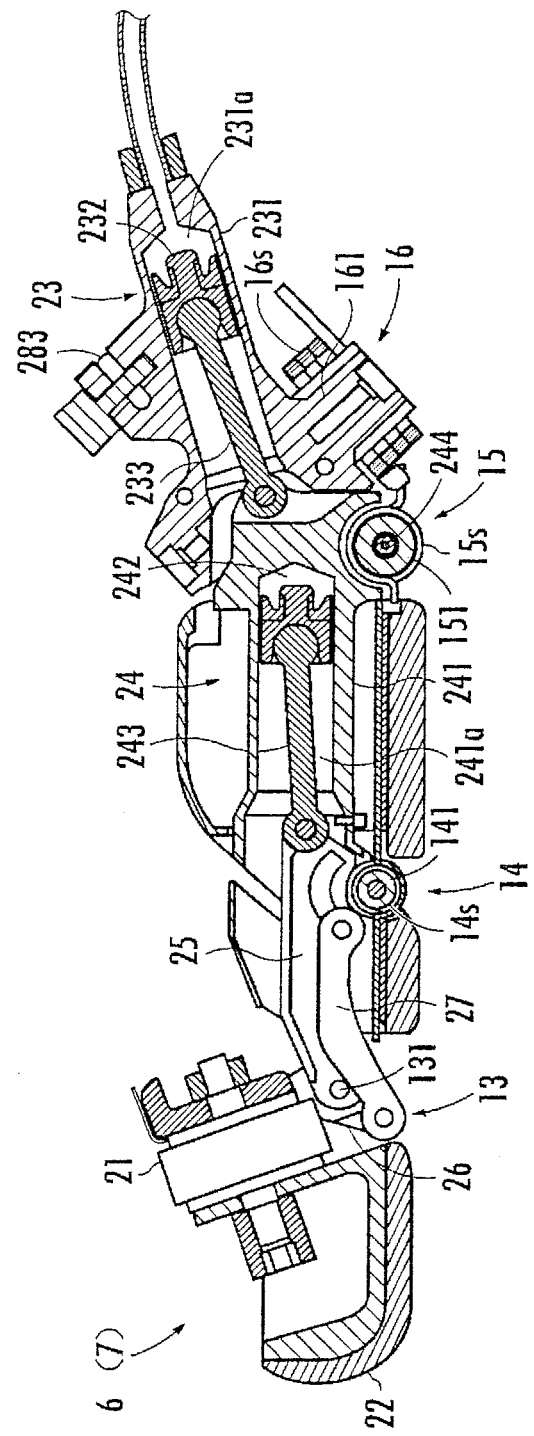
FIG. 4 is an illustrative cross-sectional view of a finger mechanism included in the hand body.

The thumb mechanism 5, the index finger mechanism 6, and the middle finger mechanism 7, which are considered as the dexterous fingers, are each provided with a force sensor, i.e. a six-axis force sensor 21, as shown in FIGS. 3 and 4. The six-axis force sensor 21 is attached, with a tilt, to a fingertip element 22 of each of the thumb mechanism 5, the index finger mechanism 6, and the middle finger mechanism 7. The six-axis force sensor 21 measures six axial forces acting on the fingertip element 22 of the dexterous finger, i.e. the translational forces in mutually orthogonal directions of three axes (x axis, y axis, and z axis), and the moments about the respective axes. The forces at the fingertips of the dexterous fingers are controlled on the basis of the measurement values of the six axial forces output from the six-axis force sensors 21.

The configuration of the index finger mechanism 6 will now be described. Referring to FIG. 4, the index finger mechanism 6 is provided with a first driven fluid pressure cylinder 23 which rotates a rotary shaft 151 of the MP1 joint 15 and a second driven fluid pressure cylinder 24 which rotates a rotary shaft 141 of the PIP joint 14.

The first driven fluid pressure cylinder 23 has a cylinder body 231 which corresponds to a human metacarpal bone. The cylinder body 231 is rotatably supported by a rotary shaft 161 of the MP2 joint 16 on the frame 10 of the base 4 (see FIG. 1). The second driven fluid pressure cylinder 24 has a cylinder body 241 which corresponds to a human proximal phalanx. The cylinder body 241 is rotatably joined to the first driven fluid pressure cylinder 23 via the rotary shaft 151 of the MP1 joint 15.

The rotary shaft 151 of the MP1 joint 15 houses therein a pipe 244 for supplying a fluid to the cylinder body 241 of the second driven fluid pressure cylinder 24. This prevents the pipe 244 from interfering with the rotation of the MP1 joint 15, thereby ensuring smooth bending and stretching operations of the index finger mechanism 6. As the fluid, hydraulic oil is specifically preferred.

Further, the cylinder body 241 of the second driven fluid pressure cylinder 24 is arranged between the MP1 joint 15 and the PIP joint 14 along the longitudinal direction of the index finger mechanism 6, resulting in a compact construction of the index finger mechanism 6.

The DIP joint 13 is joined to the PIP joint 14 via a joining element 25 which corresponds to a human middle phalanx. The DIP joint 13 has its rotary shaft 131 rotatably joined to a support element 26 which supports the six-axis force sensor 21 provided consecutively to the fingertip element 22. The joining element 25 has its one end rotatably joined to the rotary shaft 141 of the PIP joint 14, and the other end joined to the rotary shaft 131 of the DIP joint 13.

A link element 27 is also provided between the PIP joint 14 and the DIP joint 13. The link element 27 joins the cylinder body 241 of the second driven fluid pressure cylinder 24 to the support element 26 supporting the six-axis force sensor 21 of the fingertip element 22.

The first driven fluid pressure cylinder 23 has a piston 232 which slides as a fluid is supplied into a cylinder chamber 231a inside the cylinder body 231 to cause a piston rod 233 to extend or retract, to thereby rotate the MP1 joint 15. This causes the index finger mechanism 6 to bend or stretch via the MP1 joint 15.

The second driven fluid pressure cylinder 24 has a piston 242 which slides as a fluid is supplied into a cylinder chamber 241a inside the cylinder body 241 to cause a piston rod 243 to extend or retract, to thereby rotate the PIP joint 14. At this time, as the PIP joint 14 is joined to the DIP joint 13 via the joining element 25 and the link element 27, the DIP joint 13 rotates following the rotation of the PIP joint 14 by the second driven fluid pressure cylinder 24.

The DIP joint 13 is configured to move in linkage with the rotation of the PIP joint 14 by the second driven fluid pressure cylinder 24. This not only enables operations similar to those of a human finger, but also eliminates the need of a cylinder or the like for driving the DIP joint 13, thereby permitting a reduction in weight of the index finger mechanism 6.

With the configuration described above, the index finger mechanism 6 attains a bent state when the piston rods 233 and 243 of the first driven fluid pressure cylinder 23 and the second driven fluid pressure cylinder 24 are extended, while it attains a stretched state when the piston rods 233 and 243 are retracted.

The MP2 joint 16 of the index finger mechanism 6, as shown in FIG. 3, is rotated by a third driven fluid pressure cylinder 28 which has a piston rod 283 that extends and retracts in the direction in which the finger mechanisms are arranged. The third driven fluid pressure cylinder 28 causes the piston rod 283 to extend so as to swing the index finger mechanism 6 in the direction toward the middle finger mechanism 7, while it causes the piston rod 283 to retract so as to swing the index finger mechanism 6 in the direction away from the middle finger mechanism 7.

As shown in FIG. 4, the PIP joint 14, the MP1 joint 15, and the MP2 joint 16 are provided with coil springs 14s, 15s, and 16s, respectively. The coil springs 14s and 15s of the PIP joint 14 and the MP1 joint 15 each bias the index finger mechanism 6 in a stretching direction. The coil spring 16s of the MP2 joint 16 biases the index finger mechanism 6 in the direction away from the middle finger mechanism 7. In other words, the biasing directions of the respective coil springs 14s, 15s, and 16s are set to be the same as the retracting directions of the piston rods 233, 243, and 283 of the three driven fluid pressure cylinders 23, 24, and 28.

The configuration of the index finger mechanism 6 as the dexterous finger has been described above in detail. The configuration of the middle finger mechanism 7, which is also the dexterous finger, is identical to that of the index finger mechanism 6.

The ring finger mechanism 8 and the little finger mechanism 9, which are considered as the force fingers, each have a configuration identical to the above-described configuration of the index finger mechanism 6, except that the six-axis force sensor 21 and the third driven fluid pressure cylinder 28 are not provided. With the lack of the third driven fluid pressure cylinder 28, the ring finger mechanism 8 and the little finger mechanism 9 each have the MP2 joint 16 rotate freely in accordance with the force operations and each spontaneously return to its prescribed position by being biased by the coil spring 16s of the MP2 joint 16.

Figure 5:
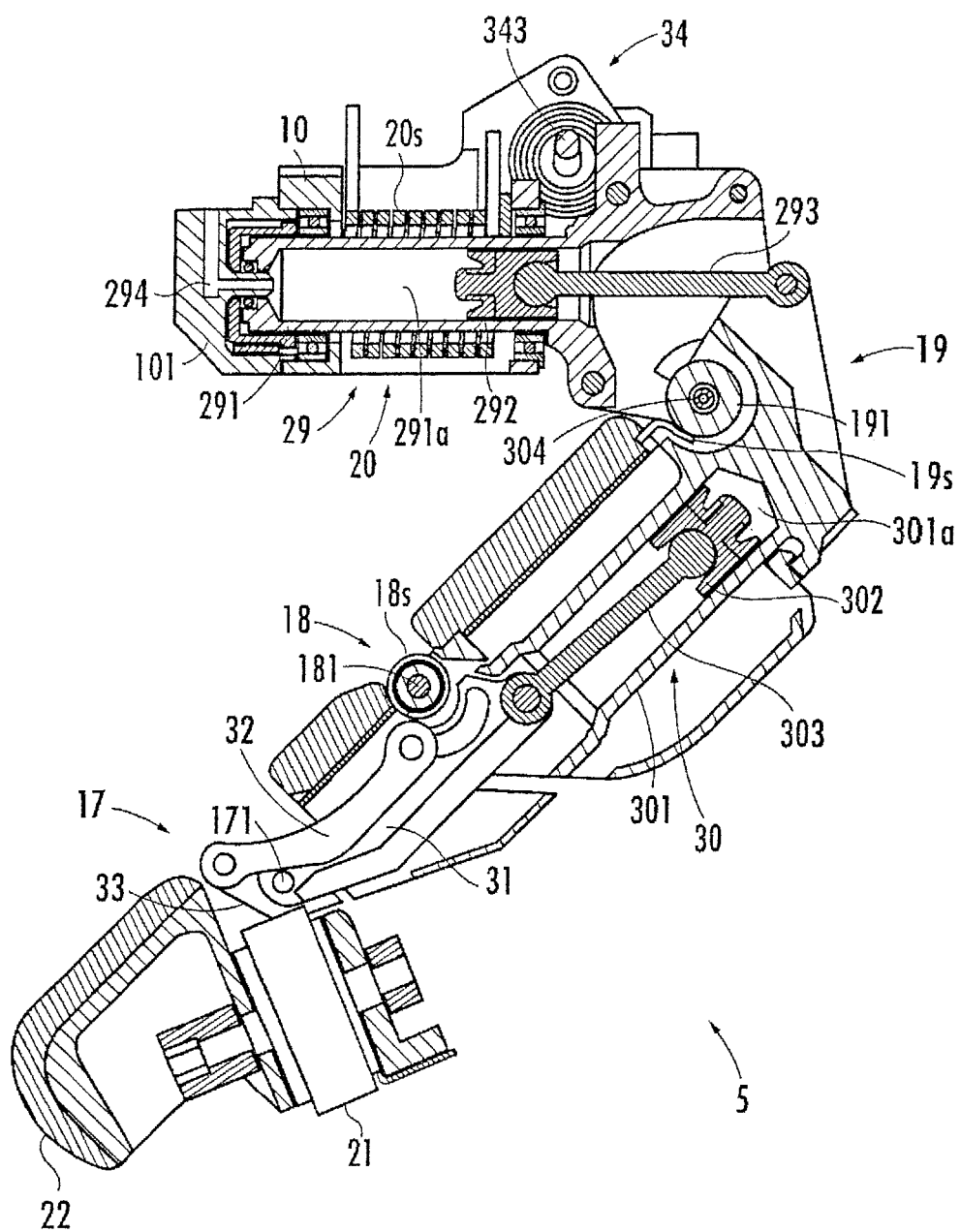
FIG. 5 is an illustrative cross-sectional view of a thumb mechanism included in the hand body.

The configuration of the thumb mechanism 5 which is considered as the dexterous finger will now be described. Referring to FIG. 5, the thumb mechanism 5 is provided with a first driven fluid pressure cylinder 29 which rotates a rotary shaft 191 of the CM1 joint 19, and a second driven fluid pressure cylinder 30 which rotates a rotary shaft 181 of the MP joint 18.

The first driven fluid pressure cylinder 29 has a cylinder body 291 which serves as a rotary shaft of the CM2 joint 20. The cylinder body 291 is rotatably supported by the frame 10 of the base 4.

As is explained above, the cylinder body 291 of the first driven fluid pressure cylinder 29 also serves as the rotary shaft of the CM2 joint 20, leading to a compact construction as compared with the case where the first driven fluid pressure cylinder 29 and the rotary shaft of the CM2 joint 20 are provided separately. Moreover, the rotation of the CM2 joint 20 yields no swinging of the first driven fluid pressure cylinder 29, eliminating the need for its swinging space. This permits an extremely compact construction.

The second driven fluid pressure cylinder 30 has a cylinder body 301 which is rotatably joined to the first driven fluid pressure cylinder 29 via the rotary shaft 191 of the CM1 joint 19.

The rotary shaft 191 of the CM1 joint 19 houses therein a pipe 304 for supplying a fluid to the cylinder body 301 of the second driven fluid pressure cylinder 30. This prevents the pipe 304 from interfering with the rotation of the CM1 joint 19, thereby ensuring smooth bending and stretching operations of the thumb mechanism 5.

The MP joint 18 is joined to the IP joint 17 via a joining element 31. The fingertip element 22 is rotatably joined to a rotary shaft 171 of the IP joint 17. The joining element 31 has its one end rotatably joined to the rotary shaft 181 of the MP joint 18 and the other end joined to the rotary shaft 171 of the IP joint 17.

Further, a link element 32 is provided between the MP joint 18 and the IP joint 17. The link element 32 joins the cylinder body 301 of the second driven fluid pressure cylinder 30 to a support element 33 which supports the six-axis force sensor 21 of the fingertip element 22.

The first driven fluid pressure cylinder 29 has a piston 292 which slides as a fluid is supplied into a cylinder chamber 291a inside the cylinder body 291 to cause a piston rod 293 to extend or retract, to thereby rotate the CM1 joint 19. This causes the thumb mechanism 5 to bend or stretch via the CM1 joint 19.

The second driven fluid pressure cylinder 30 has a piston 302 which slides as a fluid is supplied into a cylinder chamber 301a inside the cylinder body 301 to cause a piston rod 303 to extend or retract, to thereby rotate the MP joint 18. At this time, as the MP joint 18 is joined to the IP joint 17 via the joining element 31 and the link element 32, the IP joint 17 rotates following the rotation of the MP joint 18 by the second driven fluid pressure cylinder 30.

The IP joint 17 is configured to move in linkage with the rotation of the MP joint 18 by the second driven fluid pressure cylinder 30. This not only enables operations similar to those of a human finger, but also eliminates the need of a cylinder or the like for driving the IP joint 17, thereby permitting a reduction in weight of the thumb mechanism 5.

With the configuration described above, the thumb mechanism 5 attains a bent state when the piston rods 293 and 303 of the first driven fluid pressure cylinder 29 and the second driven fluid pressure cylinder 30 are extended, while it attains a stretched state when the piston rods 293 and 303 are retracted.

The CM2 joint 20 of the thumb mechanism 5, as shown in FIG. 3, is rotated by a third driven fluid pressure cylinder 34 which has a piston rod 343 that extends and retracts in the direction in which the finger mechanisms are arranged.

The thumb mechanism 5 rotates in the direction toward the palm side of the base 4 as the piston rod 343 of the third driven fluid pressure cylinder 34 is extended, while the thumb mechanism 5 rotates in the direction adjoining the index finger mechanism 6 as the piston rod 343 of the third driven fluid pressure cylinder 34 is retracted.

As shown in FIG. 5, a fluid is supplied to the cylinder body 291 of the first driven fluid pressure cylinder 29 via a fluid passage 294 which is formed inside a bearing section 101 of the cylinder body 291 of the first driven fluid pressure cylinder 29 serving as the rotary shaft of the CM2 joint 20. This enables the cylinder body 291 of the first driven fluid pressure cylinder 29 to rotate smoothly, thereby ensuring a smooth rotation of the thumb mechanism 5 by the CM2 joint 20.

As shown in FIGS. 3 and 5, the MP joint 18, the CM1 joint 19, and the CM2 joint 20 are provided with coil springs 18s, 19s, and 20s, respectively. The coil springs 18s and 19s of the MP joint 18 and the CM1 joint 19 each bias the thumb mechanism 5 in a stretching direction. The coil spring 20s of the CM2 joint 20, provided to surround the outer periphery of the cylinder body 291 of the first driven fluid pressure cylinder 29, biases the thumb mechanism 5 in the direction to rotate to adjoin the index finger mechanism 6. In other words, the biasing directions of the respective coil springs 18s, 19s, and 20s are set to be the same as the retracting directions of the piston rods 293, 303, and 343 of the three driven fluid pressure cylinders 29, 30, and 34.

A plurality of touch sensors, not shown, are provided at prescribed positions on the finger skin elements 11 covering the finger pads of the hand body 2 as well as on the base skin element 12 covering the palm side of the hand.

The above is the description of the configuration of the hand body 2. Hereinafter, the drive unit 3 configured to drive the finger mechanisms of the hand body 2 will be described.

Referring to FIG. 1, the drive unit 3 is made up of a driving cylinder unit 35 provided outside the hand body 2, a controller 36 which controls the hand body 2 via the driving cylinder unit 35, and the above-described driven fluid pressure cylinders 23, 24, 28, 29, 30, and 34.

The driving cylinder unit 35 includes a plurality of driving fluid pressure cylinders 37. The driving fluid pressure cylinder 37, as shown in FIG. 6 and FIG. 7, has a cylinder body 371 which contains therein a fluid, a piston 372 which slides inside the cylinder body 371, and a piston rod 373 which is integrated with the piston 372.

The driving fluid pressure cylinders 37 of the driving cylinder unit 35 are provided corresponding one by one to the above-described driven fluid pressure cylinders 23, 24, 28, 29, 30, and 34 built inside the hand body 2, a total of thirteen. As is schematically shown in FIG. 1, the driving fluid pressure cylinders 37 of the driving cylinder unit 35 and the driven fluid pressure cylinders 23, 24, 28, 29, 30, and 34 of the hand body 2 are respectively connected via fluid pressure transmission pipes (fluid pressure transmission paths) 38.

Figure 6:
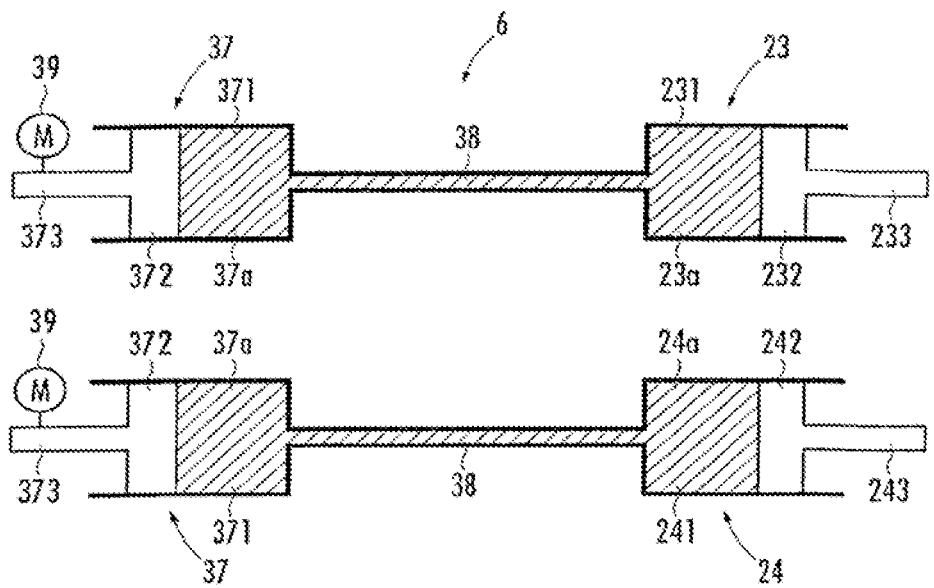
FIG. 6 schematically illustrates the configuration of part of a drive unit in the finger mechanism considered as a dexterous finger.
Figure 7:
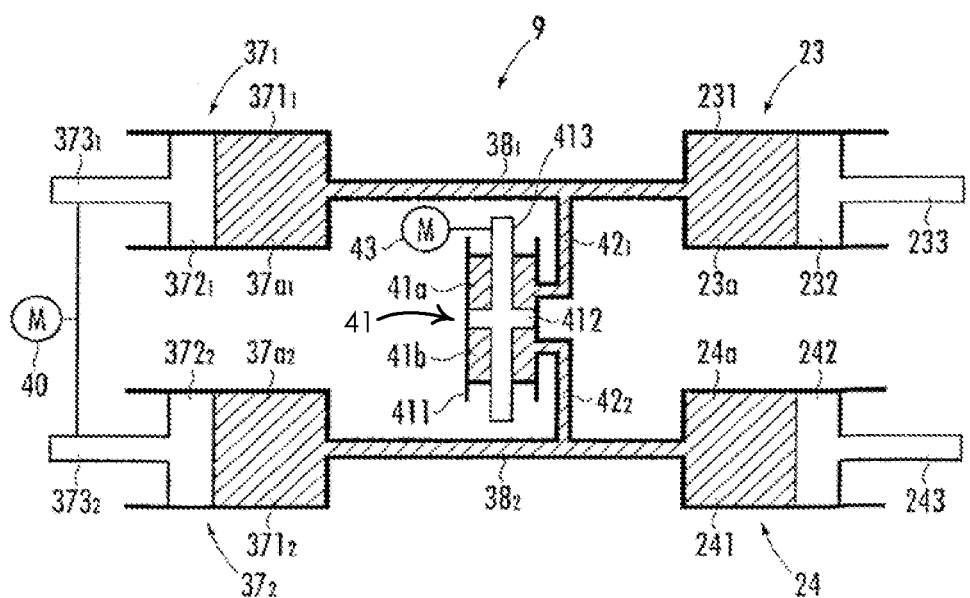
FIG. 7 schematically illustrates the configuration of part of a drive unit in the finger mechanism considered as a force finger.

In the thumb mechanism 5, the index finger mechanism 6, and the middle finger mechanism 7 that are considered as the dexterous fingers, as is schematically shown in FIG. 6, the cylinder chambers 23a, 24a, 28a, 29a, 30a, and 34a inside the driven fluid pressure cylinders 23, 24, 28, 29, 30, and 34 and cylinder chambers 37a inside the driving fluid pressure cylinders 37 are respectively connected via the fluid pressure transmission pipes 38. And, the piston rod 373 of each driving fluid pressure cylinder 37 is respectively connected to a motor 39 as a driving source for advancing and retreating of the piston rod 373. In FIG. 6, the driven fluid pressure cylinders 23, 24 of the index finger mechanism 6 are shown as a representative.

With this configuration, by sending/intaking the fluid into and from the cylinder chambers 37a of the driving fluid cylinders 37 by advancing and retreating the piston rods 373 with the motors 39, the fluid is injected into/discharged from the cylinder chambers 23a, 24a, 28a, 29a, 30a, and 34a of the driven fluid pressure cylinders 23, 24, 28, 29, 30, and 34 via the fluid pressure transmission pipes 38, and the piston rods 233, 243, 283, 293, 303, and 343 are advanced/retreated in correspondence thereto. By doing so, the driving of the finger mechanisms 5, 6, and 7 by driving fluid pressure cylinders 37 is performed.

By the controller 36 controlling the sending amount and intaking amount of the fluid in the driving fluid pressure cylinders 37 via the motors 39, more specifically, by controlling the advancing/retreating amount of the piston rods 373, it becomes possible to make the finger mechanisms 5, 6, and 7 perform desired bending and stretching operation with the driven fluid pressure cylinders 23, 24, 28, 29, 30, and 34.

On the other hand, in the ring finger mechanism 8 and the little finger mechanism 9 that are considered as the force fingers, as is schematically shown in FIG. 7, a cylinder chamber 23a inside a first driven fluid pressure cylinder 23 and a cylinder chamber $37a_1$ inside a driving fluid pressure cylinder $37_1$ are connected via a fluid pressure transmission pipe $38_1$, and a cylinder chamber 24a inside a second driven fluid pressure cylinder 24 and a cylinder chamber $37a_2$ inside a driving fluid pressure cylinder $37_2$ are connected via a fluid pressure transmission pipe $38_2$. And, piston rods $373_1$, $373_2$ of the driving fluid pressure cylinders $37_1$, $37_2$ are connected to a main motor 40 which uniformly advances and retreats the piston rods $373_1$, $373_2$.

And, a sub driving fluid pressure cylinder 41 equipped with a cylinder main body 411 which contains therein the fluid, a piston 412 which slides inside the cylinder main body 411 and which divides the inside of the cylinder main body 411 into two cylinder chambers 41a, 41b, and a piston rod 413 which is integrated with the piston 412 is provided. The cylinder chambers 41a, 41b are each configured so as to contain fluid therein, and so as to change its volume by the advancing and retreating of the piston 412 sliding inside the cylinder main body 411.

The cylinder chamber 41a of the sub driving fluid pressure cylinder 41 is connected to a fluid pressure transmission pipe $38_1$ via a connecting pipe (a connecting route) $42_1$, and the cylinder chamber 41b of the sub driving fluid pressure cylinder 41 is connected to a fluid pressure transmission pipe $38_2$ via a connecting pipe (a connecting route) $42_2$, respectively. And, the piston rod 413 of the sub driving fluid pressure cylinder 41 is connected to an assistant motor 43 as a sub driving source (sub actuator) for advancing and retreating of the piston rod 413.

With this configuration, by sending/intaking the fluid into and from the cylinder chambers $37a_1$, $37a_2$ of the driving fluid pressure cylinders $37_1$, $37_2$ by advancing and retreating the piston rods $373_1$, $373_2$ with the main motor 40, the fluid is injected into/discharged from the cylinder chambers 23a, 24a of each driven fluid pressure cylinders 23, 24 via each fluid pressure transmission pipes $38_1$, $38_2$, and the piston rods 233, 243 are advanced/retreated in correspondence thereto. At this time, advancing/retreating of the piston rods $373_1$, $373_2$ by the main motor 40 is in the same advancing/retreating direction, and has a constant ratio of advancing/retreating amount.

Therefore, depending on advancing/retreating of the piston rods $373_1$, $373_2$ by the main motor 40, the advancing/retreating of the piston rods 233, 243 of the driven fluid pressure cylinders 23, 24 are limited to those in the same advancing/retreating direction and having a constant ratio of advancing/retreating amount.

Therefore, by advancing/retreating the piston rod 413 with the assistant motor 43 and sending/intaking the fluid into and from the cylinder chambers 41a, 41b of the sub driving fluid pressure cylinder 41 via the connecting pipes $42_1$, $42_2$, the fluid is injected into/discharged from the cylinder chambers 23a, 24a of each driven fluid pressure cylinders 23, 24 via each fluid pressure transmission pipes $38_1$, $38_2$, and the piston rods 233, 243 are advanced/retreated in correspondence thereto.

The operations of the PIP joint 14 and the MP1 joint 15 are not independent and are associated. That is, the PIP joint 14 and the MP1 joint 15 are rarely operated in the opposite direction, and in the case of operation with high load such as grasping and gripping, force is generated in the same direction. Therefore, upon operation of the ring finger mechanism 8 and the little finger mechanism 9, advancing/retreating of the piston rods 233, 243 of the driven fluid pressure cylinders 23, 24 have same advancing/retreating direction, and have approximately equal ratio of advancing/retreating amount, so that the fluid pressure required by the driven fluid pressure cylinders 23, 24 does not largely differ.

Because the cylinder chambers 41a, 41b do not require large volume, an assistant driving fluid pressure cylinder 41 becomes compact in size. Further, because the rated output may be small, the assistant motor 43 becomes compact in size.

Further, a small-sized motor having the rated output to the degree of performing bending/stretching operation of the finger joints has less constituent elements that become larger in size in proportion to the rated output such as a coil or a magnet. Therefore, in the case where the main motor 40, for example having twice the rated output of the conventional motor, that corresponds to the total rated output of the motors independently driving the pistons of a plurality of the main driving fluid pressure cylinders such as in the above-mentioned conventional fluid pressure transmission device, is used, the cubic volume and the weight of the main motor 40 generally only increase by approximately 30 percent compared to the total of the conventional motors. Therefore, it becomes possible to reduce size and weight of the overall fluid pressure transmission device, to be more specific, the driving cylinder unit 35 which stores driving fluid pressure cylinders $37_1$, $37_2$, the assistant driving fluid pressure cylinder 41, the main motor 40, and the assistant motor 43 and the like.

By the controller 36 controlling the sending amount and intaking amount of the fluid in the driving fluid pressure cylinders $37_1$, $37_2$ and an assistant driving fluid pressure cylinder 41 via the main motor 40 and the assistant motor 43, more specifically, by controlling the advancing/retreating amount of the piston rods $373_1$, $373_2$, and 433, it becomes possible to make the finger mechanisms 8, 9 to perform desired bending and stretching operation with the driven fluid pressure cylinders 23, 24.

With the driving cylinder unit 35 provided outside the hand body 2, the hand body 2 is compact in size and light in weight. It is thus possible to provide the hand body 2 which is approximately equal in size to a typical human hand, for example. Further, the finger mechanisms 5, 6, 7, 8, and 9 are each actuated by the fluid pressures of the driving fluid pressure cylinders 37 and the driven fluid pressure cylinders 23, 24, 28, 29, 30, and 34. This guarantees a sufficiently large grasping force despite the compact design.

Further, the controller 36 is connected to the driving cylinder unit 35 via a signal wire 44, and controls bending and stretching of each finger mechanism by adjusting the hydraulic fluid pressures for actuation transmitted from each driving fluid pressure cylinders 37 to each driven fluid pressure cylinders 23, 24, 28, 29, 30, and 34. Further, the controller 36 is connected to the hand body 2 via a signal wire 45, and performs control of each driving fluid pressure cylinders 37, on the basis of information obtained from each six-axis force sensor 21 and above-mentioned contact sensors of the thumb mechanism 5, the index finger mechanism 6, and the middle finger mechanism 7 that are considered as the dexterous fingers. By doing so, the controller 36 controls the hand body 2 so as to perform grasping motion mimicking that of a human being with each finger mechanism of the hand body 2 of the above-described configuration.

For example in the case of causing the finger mechanisms of the hand body 2 to pick up a cylindrical object (not shown), the controller 36 controls the finger mechanisms in the following manner.

Firstly, the dexterous fingers, i.e. the thumb mechanism 5, the index finger mechanism 6, and the middle finger mechanism 7, are caused to perform an operation of pinching the object with their fingertips. Subsequently, the thumb mechanism 5, the index finger mechanism 6, and the middle finger mechanism 7 are caused to grasp the object until the object touches the base skin element 12 on the palm side. At this time, the controller 36 calculates the location, size, posture and others of the object on the basis of the information received from the six-axis force sensors 21 as well as from the touch sensors placed on the finger skin elements 11 on the finger pad sides and the base skin element 12 on the palm side. The controller 36 operates the thumb mechanism 5, the index finger mechanism 6, and the middle finger mechanism 7 on the basis of the calculation results, allowing them to dexterously manipulate the posture of the object, while balancing the same, as they uninterruptedly shift from the pinching operation to the grasping operation.

Subsequently, the controller 36 actuates the ring finger mechanism 8 and the little finger mechanism 9 to cause the ring finger mechanism 8 and the little finger mechanism 9 considered as the force fingers to grip the object with a relatively strong force. Thereafter, the thumb mechanism 5, the index finger mechanism 6, and the middle finger mechanism 7 grip the object with a relatively strong force. The above-described operations are performed under the control of the controller 36, to enable the object grasping operation mimicking that of a human being. Further, the finger mechanisms are given separate roles as the dexterous fingers and the force fingers. Therefore, it is only necessary to provide the six-axis force sensors 21 to the thumb mechanism 5, the index finger mechanism 6, and the middle finger mechanism 7, which are the dexterous fingers, while the ring finger mechanism 8 and the little finger mechanism 9 can be made small in size and light in weight.

The configuration for advancing/retreating the piston rods 373, $373_1$, $373_2$, 413, respectively, by the motor 39, the main motor 40, and the assistant motor 43 is not limited, however, a ball screw mechanism and a pulley-belt mechanism may be used, for example.

The present invention is not limited to the embodiments explained above. For example, explanation is given in the embodiment on the robot hand device 1 mimicking that of the human hand by equipping five finger mechanisms 5, 6, 7, 8, 9, however, the number of finger mechanisms and the use of the dexterous fingers and the force fingers may be changed as needed, for example. Further, the fluid pressure transmission device using the sub driving fluid pressure cylinder 41 in the finger mechanisms 5, 6, 7 considered as the dexterous fingers may be used.

Further, the fluid pressure transmission device of the present invention is not limited to be used in the robot hand device, and may be used in bending and stretching operation of the arm or leg of the robot, or a plurality of joints in devices other than the robot.

The invention claimed is:

1. A fluid pressure transmission device equipped with a plurality of main driving fluid pressure cylinders, and a plurality of driven fluid pressure cylinders with cylinder chambers thereof being connected to cylinder chambers of the main driving fluid pressure cylinders via fluid pressure transmission paths, in which fluid pressure generated by the main driving fluid pressure cylinder is transmitted to the driven fluid pressure cylinder, the fluid pressure transmission device comprising:
    a main driving source which drives pistons of a plurality of the main driving fluid pressure cylinders;
    a sub driving fluid pressure cylinder which is divided into two cylinder chambers by a piston;
    a sub driving source which drives the piston of the sub driving fluid pressure cylinder; and
    a connection path which communicates the fluid pressure transmission paths with each cylinder chamber of the sub driving fluid pressure cylinder.

2. The fluid pressure transmission device according to claim 1,
    wherein the main driving source has larger rated output than the sub driving source.

3. A robot hand device using the fluid pressure transmission device according to claim 2,
    wherein the robot hand device is equipped with a finger mechanism capable of bending and stretching by a plurality of joints, and
    the plurality of joints of the finger mechanism each bend and stretch accompanying advancing and retreating of the piston of the sub driving fluid pressure cylinder.

4. A robot hand device using the fluid pressure transmission device according to claim 1,
    wherein the robot hand device is equipped with a finger mechanism capable of bending and stretching by a plurality of joints, and
    the plurality of joints of the finger mechanism each bend and stretch accompanying advancing and retreating of the piston of the sub driving fluid pressure cylinder.

5. The robot hand device using the fluid pressure transmission device according to claim 4,
    wherein the robot hand device is equipped with a plurality of the finger mechanisms, and
    at least two or more joints of a plurality of the finger joints bend and stretch accompanying advancing and retreating of the piston of the sub driving fluid pressure cylinder.

* * * * *